United States Patent
Hu

(10) Patent No.: US 11,124,681 B2
(45) Date of Patent: Sep. 21, 2021

(54) LOW-TEMPERATURE THERMAL LAMINATING FILM AND PREPARATION METHOD AND APPLICATION THEREOF

(71) Applicant: GUANGDONG EKO FILM MANUFACTURE CO., LTD, Foshan (CN)

(72) Inventor: Minsheng Hu, Foshan (CN)

(*) Notice: Subject to any disclaimer, the term of this patent is extended or adjusted under 35 U.S.C. 154(b) by 76 days.

(21) Appl. No.: 16/432,463

(22) Filed: Jun. 5, 2019

(65) Prior Publication Data
US 2019/0284452 A1    Sep. 19, 2019

Related U.S. Application Data

(63) Continuation of application No. PCT/CN2017/099713, filed on Aug. 30, 2017.

(51) Int. Cl.
C09J 123/08     (2006.01)
C09J 7/35       (2018.01)
(Continued)

(52) U.S. Cl.
CPC ........... C09J 123/0853 (2013.01); C09J 7/00 (2013.01); C09J 7/35 (2018.01); C09J 11/06 (2013.01);
(Continued)

(58) Field of Classification Search
CPC ........ C09J 123/0852; C09J 7/00; C09J 11/06; C09J 11/08; C09J 2467/006;
(Continued)

(56) References Cited

U.S. PATENT DOCUMENTS 9,222,004 B2    12/2015   Albert et al.
2006/0135694 A1*  6/2006   Vaughan ................ C08L 53/00
                                                          525/88
(Continued)

FOREIGN PATENT DOCUMENTS

CN    102020944 A    4/2011
CN    101705060 A    5/2011
(Continued)

OTHER PUBLICATIONS

CN 102504716 EPO Machine Translation.*
International Search Report of PCT/CN2017/099713, dated May 11, 2018.

*Primary Examiner* — Laura C Powers

(57) ABSTRACT

The present disclosure provides a low-temperature thermal laminating film (10), and a preparation method and the use thereof. The low-temperature thermal laminating film (10) includes a film substrate (100) and an adhesive layer (200), wherein the adhesive layer (200) is disposed on the film substrate (100), and the raw materials of the adhesive layer (200) include an ethylene-vinyl acetate resin, a tackifier and an antioxidant, wherein the weight percentage of the ethylene-vinyl acetate resin is 70%-90%, the weight percentage of the tackifier is 5%-25%, and the weight percentage of the antioxidant is 3%-5%. The adhesive layer (200) in the low-temperature thermal laminating film (10) has a strong bonding force with the film substrate (100), and the low-temperature thermal laminating film can be laminated at relatively low-temperatures and can achieve a good laminating effect.

8 Claims, 1 Drawing Sheet

(51) Int. Cl.
  *C09J 11/06* (2006.01)
  *C09J 11/08* (2006.01)
  *C09J 7/00* (2018.01)
  *C08K 5/134* (2006.01)
  *B32B 7/12* (2006.01)
  *B32B 37/12* (2006.01)
  *B32B 7/04* (2019.01)
  *C09J 5/06* (2006.01)
  *B44F 1/02* (2006.01)

(52) U.S. Cl.
  CPC .......... *C09J 11/08* (2013.01); *B32B 7/04* (2013.01); *B32B 7/12* (2013.01); *B32B 37/12* (2013.01); *B32B 2037/1253* (2013.01); *B32B 2307/406* (2013.01); *B32B 2405/00* (2013.01); *B32B 2451/00* (2013.01); *B44F 1/02* (2013.01); *C08K 5/1345* (2013.01); *C09J 5/06* (2013.01); *C09J 2423/106* (2013.01); *C09J 2427/006* (2013.01); *C09J 2467/006* (2013.01)

(58) Field of Classification Search
  CPC . C09J 2427/006; C09J 2423/106; B32B 7/04; B32B 7/12; B32B 37/12; B32B 2037/1253; B32B 2037/406; B32B 2405/00; B32B 2451/00; B44F 1/02; C08K 5/1345
  See application file for complete search history.

(56) References Cited

U.S. PATENT DOCUMENTS

2007/0122600 A1    5/2007    Yoshino et al.
2015/0158985 A1    6/2015    Fitch et al.

FOREIGN PATENT DOCUMENTS

| CN | 201817432 U | 5/2011 | |
|---|---|---|---|
| CN | 102504716 A | 6/2012 | |
| CN | 107523231 A | 12/2017 | |
| WO | WO-2016029006 A1 * | 2/2016 | ........... C09J 11/08 |

\* cited by examiner

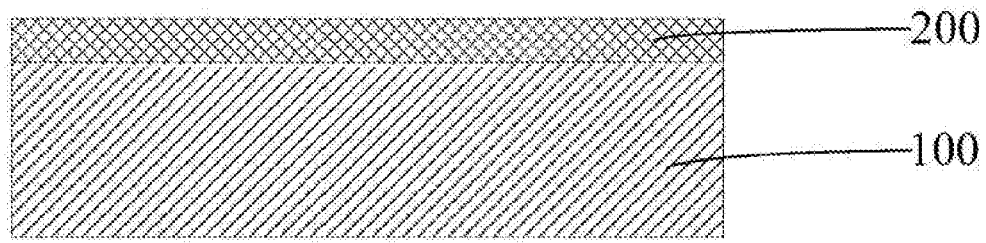

LOW-TEMPERATURE THERMAL LAMINATING FILM AND PREPARATION METHOD AND APPLICATION THEREOF

CROSS-REFERENCE TO RELATED APPLICATIONS

This application is a continuation of International Patent Application No. PCT/CN2017/099713 with a filing date of Aug. 30, 2017, designating the United States. The content of the aforementioned applications, including any intervening amendments thereto, are incorporated herein by reference.

TECHNICAL FIELD

The present disclosure relates to the field of printing and decoration technology, in particular to a low-temperature thermal laminating film and a preparation method and application thereof.

BACKGROUND OF THE PRESENT INVENTION

The thermal laminating film refers to a plastic film coated with a hot melt adhesive on the surface, which can be used for film laminating processing of printed matters by hot pressing. The thermal laminating film plays a role of protection and beauty, and the printed matters will have a smooth and bright surface with good glossiness and color fastness after the treatment of the thermal laminating film.

The thermal laminating film is usually composed of a substrate layer, a tie layer and a hot melt adhesive layer. The tie layer is typically a high molecular weight polyethyleneimine aqueous solution (AC agent) for increasing the binding force between the substrate layer and the hot melt adhesive layer. However, when the conventional thermal laminating film is conducted laminating, the hot melt adhesive layer generally requires to be heated to 90° C.-110° C., the cost of the film laminating is high, and a large amount of energy is consumed. Moreover, when the temperature is high, the overall performance of the substrate and the printed matter will decrease, resulting in abnormal quality and poor film laminating effect. In addition, an aqueous solution of ethyleneimine (AC agent) will generate volatile organic compounds (VOCs) at the high temperature, which damages to the environment.

SUMMARY OF THE DISCLOSURE

In view of this, it is necessary to provide a low-temperature thermal laminating film with low film laminating temperature, low film cost, energy saving and environmental friendly, and a preparation method and application thereof.

A low-temperature thermal laminating film, including:
A film substrate;
An adhesive layer, wherein the adhesive layer is disposed on the film substrate, and the raw material of the adhesive layer comprises an ethylene-vinyl acetate resin and a tackifier and an antioxidant, wherein the weight percentage of the ethylene-vinyl acetate resin is 70%-90%, the weight percentage of the tackifier is 5%-25%, and the weight percentage of the antioxidant is 3%-5%.

The low-temperature thermal laminating film of the present disclosure is composed of a film substrate and an adhesive layer. The present disclosure combines 70%-90% by weight of ethylene-vinyl acetate resin, 5%-25% by weight of tackifier and 3%-5% by weight of the antioxidant to improve the performance of the adhesive layer. By controlling the proportion ratio of each component in the adhesive layer, it is ensured that the adhesive layer has strong adhesive force, and the adhesive layer has good matching with the film substrate and strong bonding force. The adhesive layer of the low-temperature thermal laminating film can be directly combined with the film substrate, and no tie layer is required, which simplifies the preparation process of the low-temperature thermal laminating film, can improve the production efficiency, and avoids the problem that the AC agent in the tie layer pollutes the environment.

In addition, by controlling the proportion ratio of each component in the adhesive layer, the use temperature of the adhesive layer can be lowered, so that the low-temperature thermal laminating film can be processed under relatively low-temperature conditions. Therefore, the low-temperature thermal laminating film of the present disclosure can significantly reduce energy consumption and reduce cost of film laminating. Moreover, when the film treatment is carried out under a lower temperature condition, the overall performance of the film substrate and the printed matter is relatively stable, and the film laminating effect is better.

In one embodiment, the weight percentage of the ethylene-vinyl acetate resin is 75% to 85%, and the weight percentage of the tackifier is 10% to 20%.

In one embodiment, the weight percentage of the ethylene-vinyl acetate resin is 85%, the weight percentage of the tackifier is 12%, and the weight percentage of the antioxidant is 3%. The adhesive layer prepared according to the present embodiment has a strong adhesive force and a low melt temperature.

In one embodiment, the film substrate is a polyester film, a polypropylene film, or a polyvinyl chloride film.

In one embodiment, a vinyl acetate content of the ethylene-vinyl acetate resin is 20 wt %-40 wt % and a melt index of the ethylene-vinyl acetate resin is 100 g/10 min to 400 g/10 min. The present disclosure improves the properties of the ethylene-vinyl acetate resin by having a vinyl acetate content of 20% to 40% by weight and a melt index of 100 g/10 min to 400 g/10 min. The ethylene-vinyl acetate resin is prepared with a tackifier and an antioxidant to form a adhesive layer. The adhesive layer has good matching performance with the film substrate, and has strong binding force, and the formed low-temperature thermal laminating film has good stability. In addition, the melting temperature of the adhesive layer is relatively low, and the film laminating treatment can be carried out at a relatively low-temperature, and the film laminating effect is good.

The ethylene-vinyl acetate (EVA) resin of the present disclosure has a VA content of 20 wt %-40 wt %. If the VA content is too high, the stability of the ethylene-vinyl acetate (EVA) resin is poor, such that the stability of the formed adhesive layer is also poor. If the VA content is too low, the bonding force of the interlayer between the adhesive layer and the film substrate is lowered, and the melting temperature of the adhesive layer is high. The melt index is from 100 g/10 min to 400 g/10 min, the viscosity of the flowability of EVA is low, and the fluidity is good, which is favorable for diffusion and penetration on the surface of the film substrate, and the bonding strength of the formed adhesive layer and the film substrate is good.

In one embodiment, a softening temperature of the ethylene-vinyl acetate resin is equal to or lower than 40° C., and a melting point of the ethylene-vinyl acetate resin is equal to or lower than 65° C. By controlling the softening temperature and melting point of the ethylene-vinyl acetate resin, it is ensured that the use temperature of the prepared adhesive layer is lowered to 60° C.-80° C., which can significantly reduce energy consumption, reduce VOC gas emissions, and ensure the effect of the film is good.

In one embodiment, the tackifier is a terpene resin, a water-white resin, a rosin resin or a hydrogenated petroleum resin, and/or the antioxidant is a pentaerythritol-tetra-[β-(3,5-di-tert-butyl-4-hydroxyphenyl)-propionate].

In addition, it is also necessary to provide a method for preparing a low-temperature thermal laminating film.

A method for preparing the low-temperature thermal laminating film as described above, including the following steps:

respectively taking an ethylene-vinyl acetate resin, a tackifier and an antioxidant according to a raw material ratio of an adhesive layer;

mixing the ethylene-vinyl acetate resin, the thickener and the antioxidant, stirring uniformly, and then forming a glue in a molten state by heating;

applying the glue on a surface of the film substrate to cure to form the adhesive layer, that is, the low-temperature thermal laminating film is obtained.

The adhesive layer of the low-temperature thermal laminating film in the present disclosure is prepared by a laminating process. The adhesive layer of the conventional thermal laminating film needs to be prepared by a co-extrusion casting compounding process, and the preparation temperature requires to reach above 200° C., and the energy waste is relatively large. Moreover, the conventional thermal laminating film further requires to prepare a tie layer which is prepared by a wet laminating process and needs to be dried, and thus consumes energy. Therefore, the low-temperature thermal laminating film of the present disclosure has simple preparation process, small energy loss, low preparation cost, high preparation efficiency, and is convenient for industrial production.

In one embodiment, a step of conducting a corona treating to the surface of the film substrate.

In addition, it is also necessary to provide a method for film laminating treatment.

A method for film laminating treatment, conducting a laminating treatment on a surface of a printed matter using the above-described low-temperature thermal laminating film.

The method for film laminating treatment is simple, low in cost, and can efficiently carry out a laminating treatment on the printed matter.

In addition, it is also necessary to provide a film-coated printed matter.

The film-coated printed matter is prepared by laminating an adhesive layer of the low-temperature thermal laminating film as described above on a surface of a printed matter.

The adhesive layer of the low-temperature thermal laminating film of the present disclosure can be melted under a relatively low-temperature condition, and can be laminated on the surface of the printed matter, that is, a film-coated print can be obtained. The film-coated printed matter is simple in preparation, environmentally friendly, and the surface thereof is smooth and bright, the glossiness and color fastness are remarkably enhanced, and the performance such as waterproof resistance, oil resistance and abrasion resistance are better.

BRIEF DESCRIPTION OF THE DRAWINGS

FIG. 1 is a schematic view showing the structure of a low-temperature thermal laminating film according to an embodiment.

DESCRIPTION OF THE REFERENCE SIGNS 10. low-temperature thermal laminating film; 100. Film substrate; 200. Adhesive layer.

DETAILED DESCRIPTION OF THE EMBODIMENTS

In order to facilitate the understanding of the present disclosure, the present disclosure will be described more comprehensive with reference to the accompanying drawings. Preferred embodiments of the present disclosure are shown in the drawings. However, the present disclosure may be achieved in many different forms and is not limited to the embodiments described herein. Rather, these embodiments are provided so that the understanding of the present disclosure will be clearer and completely.

It should be noted that when an element is referred to as being "fixed" to another element, it can be directly on the other element or indirectly. When an element is considered to be "connected" to another element, it can be directly connected to the other element or indirectly.

All technical and scientific terms used herein have the same meaning as commonly understood by one of ordinary skill in the art to which this disclosure belongs, unless otherwise defined. The terminology used in the description of the present disclosure is only for the purpose of describing particular embodiments and is not intended to limit the present disclosure. The term "and/or" as used herein includes any and all combinations of one or more of the associated listed items.

In the embodiment as shown in FIG. 1, the low-temperature thermal laminating film 10 includes a film substrate 100 and an adhesive layer 200. The adhesive layer 200 is provided on the film substrate 100.

The film substrate 100 is a film such as a polyester film, a polypropylene film, a polyvinyl chloride film, a nylon film, or a polyethylene film. Alternatively, the film substrate 100 is a film of a biax-orientation polyester film, a cast polypropylene film, a calendered polyvinyl chloride film, or the like. The thickness of the film substrate 100 can be adjusted according to actual processing needs.

The adhesive layer 200 is disposed on the film substrate 100. The raw material of the adhesive layer 200 includes an ethylene-vinyl acetate resin, a tackifier, and an antioxidant. Wherein, a weight percentage of the ethylene-vinyl acetate resin is 70% to 90%, such as, but not limited to 70%, 75%, 80%, 85% or 90%. A weight percentage of the tackifier is from 5% to 25%, such as, but not limited to 5%, 10%, 15%, 20% or 25%. And the weight percentage of the antioxidant is from 3% to 5%, such as, but not limited to 3%, 4% or 5%. The sum of the weight percentages of the components in the raw material of the adhesive layer 200 is 100%.

Alternatively, the weight percentage of the ethylene-vinyl acetate resin is from 75% to 85% and the weight percentage of the tackifier is from 10% to 20%. Further Alternatively, the weight percentage of the ethylene-vinyl acetate resin is 85%, the weight percentage of the tackifier is 12%, and the weight percentage of the antioxidant is 3%. The adhesive layer 200 prepared by the preparation of this embodiment has a good adhesion and a low melting temperature.

In one embodiment, a vinyl acetate content in the ethylene-vinyl acetate resin is from 20 wt % to 40 wt %, and may be, for example, but not limited to, 20 wt %, 25 wt %, 30 wt %, 35 wt % or 40 wt %. The melt index of the ethylene-vinyl acetate resin is from 100 g/10 min to 400 g/10 min, and may be, for example, but not limited to, 100 g/10 min, 200 g/10 min, 300 g/10 min or 400 g/10 min. The present disclosure improves the properties of the ethylene-vinyl acetate resin by having a vinyl acetate content of 20 wt % to 40 wt % and a melt index of 100 g/10 min to 400 g/10 min. The ethylene-vinyl acetate resin is prepared with a tackifier and an antioxidant to form the adhesive layer 200. The adhesive layer 200 has a good matching performance with the film substrate 100, and has strong bonding force, and the formed low-temperature thermal laminating film 10 has a good stability. Further, the adhesive layer 200 has a relatively low melting temperature, and can be subjected to a film laminating treatment at a relatively low-temperature, and the film laminating effect is good.

The ethylene-vinyl acetate (EVA) resin in the present disclosure has a VA content of 20 wt % to 40 wt %. If the VA content is too high, the stability of the ethylene-vinyl acetate (EVA) resin is poor, and the stability of the prepared adhesive layer 200 is also poor. If the VA content is too low, the bonding force of the interlayer between the adhesive layer 200 and the film substrate 100 is lowered, and the melting temperature of the adhesive layer 200 is high. The melt index is from 100 g/10 min to 400 g/10 min. The viscosity of the flowability of the EVA is low, and the fluidity of the EVA is good, which facilitates diffusion and penetration on the surface of the film substrate 100, and the bonding force between the formed adhesive layer 200 and the film substrate 100 is good.

In one embodiment, a softening temperature of the ethylene-vinyl acetate resin is lower than or equal to 40° C., and a melting point of the ethylene-vinyl acetate resin is 65° C. or lower. By controlling the softening temperature and melting point of the ethylene-vinyl acetate resin, it is ensured that the use temperature of the formed adhesive layer 200 is lowered to 60° C.-80° C., which can significantly reduce energy consumption, reduce VOC gas emissions, and ensure that the effect of the film laminating is better.

The tackifier is mainly used to further increase the initial adhesion force and holding adhesion force of the adhesive layer 200. The addition of the tackifier to the EVA resin further enhances the bonding force between the adhesive layer 200 and the film substrate 100. Alternatively, the tackifier is a resin such as a terpene resin, a water white resin, a rosin resin or a hydrogenated petroleum resin, which has excellent compatibility, weather resistance and viscosity increasing effect.

The antioxidant is mainly used to improve the stability of the adhesive layer 200. Alternatively, the antioxidant is pentaerythritol-tetra-[β-(3,5-di-tert-butyl-4-hydroxyphenyl)-propionate]. The pentaerythritol-tetra-[β-(3,5-di-tert-butyl-4-hydroxyphenyl)-propionate] has good oxidation resistance and the prepared adhesive layer 200 has good stability.

The low-temperature thermal laminating film 10 of the present disclosure is composed of a film substrate 100 and an adhesive layer 200. The present disclosure combines 70%-90% by weight of ethylene-vinyl acetate resin, 5%-25% by weight of tackifier and 3%-5% by weight of antioxidant to improve the performance of the adhesive layer 200. By controlling the proportion ratio of each component in the adhesive layer 200, it is ensured that the adhesive layer 200 has a strong adhesive force, and the adhesive layer 200 has good matching with the film substrate 100 and has strong bonding force. The adhesive layer 200 of the low-temperature thermal laminating film 10 can be directly combined with the film substrate 100 without the need of providing a tie layer, which simplifies the preparation process of the low-temperature thermal laminating film 10, can improve the production efficiency, and avoids the pollution issues caused by the AC agent in the tie layer.

In addition, by controlling the proportion ratio of each component in the adhesive layer 200, the use temperature of the adhesive layer 200 can be lowered, and the low-temperature thermal laminating film 10 can complete the film laminating process under relatively low-temperature conditions. Therefore, the low-temperature thermal laminating film 10 of the present disclosure can significantly reduce energy consumption and reduce cost of film laminating. Moreover, when the film laminating treatment is carried out under a lower temperature condition, the overall performance of the film substrate 100 and the printed matter is relatively stable, and the film laminating effect is better.

In addition, it is also necessary to provide a method for preparing a low-temperature thermal laminating film 10.

A method for preparing the low-temperature thermal laminating film 10 as described above, including the following steps:

1) taking an ethylene-vinyl acetate resin, a tackifier and an antioxidant according to a raw material ratio of an adhesive layer, respectively;

2) mixing the ethylene-vinyl acetate resin, the thickener and the antioxidant, stirring uniformly, and then forming a glue in a molten state by heating;

Alternatively, in order to uniformly mix the components in the raw material, the three components may be first subjected to blending extrusion granulation using a single-screw extruder to obtain a master batch. Specifically, the corresponding object is first weighed according to the weight of the formula, and then the components are thoroughly stirred by means of material agitation, added together to the extruder hopper, and extruded and granulated. The master batch is heated and plasticized by a single-screw extruder and extruded into a glue pen to form a molten state glue, which is reserved.

3) applying the glue on a surface of the film substrate 100 to cure to form the adhesive layer 200, that is, the low-temperature thermal laminating film 10 is obtained. Alternatively, the prepared adhesive layer 200 is subjected to corona treatment, and the low-temperature thermal laminating film 10 is subjected to winding processing.

In one embodiment, since the EVA has a large MI value and good fluidity, the prepared glue can be applied to the surface of the film substrate 100 by roll coating or blade coating. Specifically, the glue melted in the glue pan is taken by the rotation of the heating steel roller, and then the glue amount of sizing per unit area is controlled by the gap of the blade. When the film substrate 100 is passed through the heating steel roller, the glue can be coated on the surface of the film substrate 100 by the blade, and the film is cured and shaped to form the adhesive layer 200, that is, a low-temperature thermal laminating film 10 is obtained.

In one embodiment, the film substrate is carried out corona treatment before applying the glue to provide a more uniform coating on the film substrate. Alternatively, the glue applied to the film substrate is cured and shaped by heating or drying.

The low-temperature thermal laminating film 10 has a simple preparation method, high preparation efficiency, and is convenient for industrial production.

In addition, it is also necessary to provide a method for film laminating treatment.

A method for film laminating treatment, conducting a laminating treatment on a surface of a printed matter using the above-described low-temperature thermal laminating film 10.

Alternatively, the adhesive layer 200 of the low-temperature thermal laminating film 10 is melted by heating and pressing using a laminating machine, and is laminated on the surface of a plurality of print matters to complete the film laminating treatment. Wherein, the heating temperature of the laminating machine does not exceed 90° C., and the pressure is not lower than 2 Mpa.

The method for film laminating treatment is simple, low in cost, and it can efficiently carry out a laminating treatment on the printed matter.

In addition, it is also necessary to provide a film-coated print matter.

The film-coated print matter is prepared by laminating the adhesive layer 200 of the low-temperature thermal laminating film 10 on the surface of a printed matter (not shown).

The adhesive layer 200 of the low-temperature thermal laminating film 10 of the present disclosure is melted under a relatively low-temperature condition, and is further capable of being laminated on the surface of the printed matter, that is, a film-coated print matter is obtained. The film-coated print matter is simple in preparation, environmentally friendly, and the surface thereof is smooth and bright, the glossiness and color fastness are remarkably enhanced, and the water resistance, oil resistance and abrasion resistance are better.

The film-coated print matter can be a book, a picture album, a commemorative album, a postcard, a product brochure, a calendar, a map, etc., and is not limited to the above printed matter.

EMBODIMENTS

Embodiment 1 Preparation of a Low-Temperature Thermal Laminating Film 1

1) according to the weight percentage of each component in the raw materials, 85% of ethylene-vinyl acetate resin, 12% of terpene resin and 3% of pentaerythritol-tetra-[β-(3,5-di-tert-butyl-4-hydroxyphenyl)-propionate] are taken. Wherein, the ethylene-vinyl acetate resin has a VA content of 30 wt % and a melt index of 100 g/10 min.

2) the ethylene-vinyl acetate resin, terpene resin and pentaerythritol-tetra-[β-(3,5-di-tert-butyl-4-hydroxyphenyl)-propionate] are put into a container to stir and mix evenly, and then the master batch is prepared by a single screw extruder for use.

3) the master batch is melt and plasticized using a single-screw extruder to form a glue, which is extruded into a glue pan for use.

4) A biaxially oriented polypropylene film substrate is provided, and the surface on which the glue is applied is subjected to corona treatment. When the biaxially oriented polypropylene film substrate is passed through the heating steel roller, the glue is applied to the surface of the biaxially oriented polypropylene film substrate by a blade, and is naturally dried and cured to form an adhesive layer.

5) a corona treatment is performed on the adhesive layer, that is, the low-temperature thermal laminating film 1 is obtained. Finally, the low-temperature thermal laminating 1 is wound and placed for use.

Embodiment 2 Preparation of a Low-Temperature Thermal Laminating Film 2

The difference between the present embodiment and embodiment 1 is that:

According to the weight percentage of each component in the raw materials, 70% of ethylene-vinyl acetate resin, 25% of water white resin and 5% of pentaerythritol-tetra-[β-(3,5-di-tert-butyl-4-hydroxyphenyl)-propionate] are taken. Wherein, the ethylene-vinyl acetate resin has a VA content of 20 wt % and a melt index of 200 g/10 min.

Embodiment 3 Preparation of a Low-Temperature Thermal Laminating Film 3

The difference between the present embodiment and the embodiment 1 is that:

According to the weight percentage of each component in the raw materials, 90% of ethylene-vinyl acetate resin, 5% of rosin resin and 5% of pentaerythritol-tetra-[β-(3,5-di-tert-butyl-4-hydroxyphenyl)-propionate] are taken. Wherein, the ethylene-vinyl acetate resin has a VA content of 30 wt % and a melt index of 400 g/10 min.

Embodiment 4 Preparation of a Low-Temperature Thermal Laminating Film 4

The difference between the present embodiment and the embodiment 1 is that:

According to the weight percentage of each component in the raw materials, 75% of ethylene-vinyl acetate resin, 20% of terpene resin and 5% of pentaerythritol-tetra-[β-(3,5-di-tert-butyl-4-hydroxyphenyl)-propionate] are taken. Wherein, the ethylene-vinyl acetate resin has a VA content of 40 wt % and a melt index of 150 g/10 min.

Embodiment 5 Preparation of a Low-Temperature Thermal Laminating Film 5

The difference between the present embodiment and the embodiment 1 is that:

According to the weight percentage of each component in the raw materials, 85% of ethylene-vinyl acetate resin, 10% of hydrogenated petroleum resin and 5% of pentaerythritol-tetra-[β-(3,5-di-tert-butyl-4-hydroxyphenyl)-propionate] are taken. Wherein, the ethylene-vinyl acetate resin has a VA content of 30 wt % and a melt index of 110 g/10 min.

Comparative Example 1 Preparation of the Thermal Laminating Film 1

The difference between the present embodiment and the embodiment 1 is that:

According to the weight percentage of each component in the raw materials, 65% of ethylene-vinyl acetate resin, 30% of terpene resin and 5% of pentaerythritol-tetra-[β-(3,5-di-tert-butyl-4-hydroxyphenyl)-propionate] are taken. Wherein, the ethylene-vinyl acetate resin has a VA content of 30 wt % and a melt index of 100 g/10 min.

Comparative Example 2 Preparation of Thermal Laminating Film 2

The difference between this embodiment and Embodiment 1 is that:

According to the weight percentage of each component in the raw materials, 95% of ethylene-vinyl acetate resin, 3% of terpene resin and 2% of pentaerythritol-tetra-[β-(3,5-di-tert-butyl-4-hydroxyphenyl)-propionate] are taken. Wherein, the ethylene-vinyl acetate resin has a VA content of 30 wt % and a melt index of 100 g/10 min.

Effect Test Example

The low-temperature thermal laminating film prepared in embodiment 1, the thermal laminating films 1 and 2 prepared in comparative examples 1 and 2, and the commercially available thermal laminating film (three-layer structure containing a substrate/tie layer/hot melt adhesive layer) are respectively taken. The laminating treatment can be completed on the printing paper by using a laminating machine and adjusting the heating temperature and the heating pressure. The film laminating results are as follows:

When the low-temperature thermal laminating film 1 of embodiment 1 is carried out a film laminating treatment, the laminating machine has a heating temperature of 70° C. and a pressure of 2.5 Mpa. After the film laminating process is completed, the film laminating effect of the printing paper is good. In addition, the low-temperature thermal laminating film 1 is subjected to interlaminar peeling test using a 3M adhesive tape, and the test turned out that the peeling phenomenon of the adhesive layer did not occur in the low-temperature thermal laminating film 1.

When the thermal laminating film 1 of comparative example 1 is carried out a laminating treatment, the laminating machine has a heating temperature of 85° C. and a pressure of 3 Mpa. After the film laminating process is completed, the film laminating effect of the printing paper is poor. In addition, the thermal laminating film 1 is subjected to an interlaminar peeling test using a 3M adhesive tape, and the test turned out that the peeling phenomenon of the adhesive layer occurs in the thermal laminating film 1.

When the thermal laminating film 2 in comparative example 2 is carried out a film laminating treatment, the laminating machine has a heating temperature of 88° C. and a pressure of 2.8 Mpa. After the film laminating process is completed, the film laminating effect of the printing paper is poor. In addition, the thermal laminating film 2 is subjected to an interlaminar peeling test using a 3M adhesive tape, and the test turned out that the peeling phenomenon of the adhesive layer occurs in the thermal laminating film 2.

When the commercially available thermal laminating film was carried out a film laminating treatment, the laminating machine has a heating temperature at a temperature of 95° C. and a pressure of 4 Mpa. After the film laminating process is completed, the film laminating effect of the printing paper is general. In addition, the commercially available thermal laminating film was carried out an interlaminar peeling test using a 3M adhesive tape, and the test turned out that the peeling phenomenon of the adhesive layer did not occur in the commercially available thermal laminating film.

Therefore, the low-temperature thermal laminating film prepared in the present disclosure has a good matching performance and a strong bonding force with the film substrate, and can carry out film laminating at a lower temperature condition. The film laminating process has less influence on the comprehensive performance of the film substrate and the printed matter, and the film laminating effect is better.

The technical features of the above-described embodiments may be arbitrarily combined. For the sake of brevity of description, not all possible combinations of the technical features in the above embodiments are described. However, as long as there is no contradiction between the combinations of these technical features, All should be considered as the scope of the specification.

The embodiments described above represent only several embodiments of the present disclosure, and the description thereof is more specific and detailed, but is not to be construed as an limitation to the scope of the present disclosure. It should be noted that variations and modifications may be made by those skilled in the art without departing from the spirit and scope of the present disclosure, which are within the scope of the present disclosure. Therefore, the scope of the present disclosure should be determined by the appended claims.

I claim:

1. A low-temperature thermal laminating film, comprising:
    a film substrate; and
    an adhesive layer;
    wherein the adhesive layer is disposed on the film substrate;
    the adhesive layer is consisted of 70% wt-90% wt of ethylene-vinyl acetate resin, and 5% wt-25% wt of tackifier, and 3% wt-5% wt of antioxidant;
    wherein a vinyl acetate content of the ethylene-vinyl acetate resin is 20 wt %-40 wt % and a melt index of the ethylene-vinyl acetate resin is 100 g/10 min to 400 g/10 min;
    wherein a softening temperature of the ethylene-vinyl acetate resin is equal to or lower than 40° C., and a melting point of the ethylene-vinyl acetate resin is equal to or lower than 65° C.

2. The low-temperature thermal laminating film according to claim 1, wherein the adhesive layer is consisted of 75% wt-85% wt of ethylene-vinyl acetate resin, and 10% wt-20% wt of tackifier, and 3% wt-5% wt of antioxidant.

3. The low-temperature thermal laminating film according to claim 2, wherein the adhesive layer is consisted of 85% wt of ethylene-vinyl acetate resin, and 12% wt of tackifier, and 3% wt of antioxidant.

4. The low-temperature thermal laminating film according to claim 1, wherein the film substrate is selected from the group consisting of polyester film, polypropylene film or polyvinyl chloride film.

5. The low-temperature thermal laminating film according to claim 1, wherein the tackifier is selected from the group consisting of terpene resin, water-white resin, rosin resin or hydrogenated petroleum resin; and/or
    the antioxidant is a pentaerythritol-tetra-[β-(3,5-di-tert-butyl-4-hydroxyphenyl)-propionate].

6. A method for preparing a low-temperature thermal laminating film according to claim 1, comprising:
    respectively taking an ethylene-vinyl acetate resin, a tackifier and an antioxidant according to a raw material ratio of an adhesive layer;
    mixing the ethylene-vinyl acetate resin, the thickener and the antioxidant stirring uniformly, and then forming a glue in a molten state by heating;
    applying the glue on a surface of the film substrate to cure to form the adhesive layer,
    that is, obtaining the low-temperature thermal laminating film;
    wherein the adhesive layer is consisted of 70% wt-90% wt of ethylene-vinyl acetate resin, and 5% wt-25% wt of tackifier, and 3% wt-5% wt of antioxidant;
    wherein a vinyl acetate content of the ethylene-vinyl acetate resin is 20 wt %-40 wt % and a melt index of the ethylene-vinyl acetate resin is 100 g/10 min to 400 g/10 min;
    wherein a softening temperature of the ethylene-vinyl acetate resin is equal to or lower than 40° C., and a melting point of the ethylene-vinyl acetate resin is equal to or lower than 65° C.

7. The method of producing a low-temperature thermal laminating film according to claim 6, further comprising the step: conducting a corona treating to the surface of the film substrate.

8. A film-coated printed matter, wherein the film-coated printed matter is prepared by laminating an adhesive layer of a low-temperature thermal laminating film on a surface of a printed matter;
- wherein the low-temperature thermal laminating film comprises:
- a film substrate; and
- an adhesive layer;
- wherein the adhesive layer is disposed on the film substrate;
- the adhesive layer is consisted of 70% wt-90% wt of ethylene-vinyl acetate resin, and 5% wt-25% wt of tackifier, and 3% wt-5% wt of antioxidant;
- wherein a vinyl acetate content of the ethylene-vinyl acetate resin is 20 wt %-40 wt % and a melt index of the ethylene-vinyl acetate resin is 100 g/10 min to 400 g/10 min;
- wherein a softening temperature of the ethylene-vinyl acetate resin is equal to or lower than 40° C., and a melting point of the ethylene-vinyl acetate resin is equal to or lower than 65° C.

* * * * *